US012459486B2

(12) United States Patent
Valverde et al.

(10) Patent No.: US 12,459,486 B2
(45) Date of Patent: *Nov. 4, 2025

(54) METHODS AND SYSTEMS FOR REDUCING VEHICLE DELAY BASED ON MOVEMENT PREDICTION

(71) Applicant: Torc Robotics, Inc., Blacksburg, VA (US)

(72) Inventors: Rikki Valverde, Bala Cynwyd, PA (US); Lorenzo Tarsitano, Stuttgart (DE)

(73) Assignee: TORC Robotics, Inc., Blacksburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,265

(22) Filed: May 10, 2024

(65) Prior Publication Data
US 2025/0058761 A1    Feb. 20, 2025

Related U.S. Application Data

(63) Continuation of application No. 18/235,325, filed on Aug. 17, 2023, now Pat. No. 12,017,632.

(51) Int. Cl.
*B60W 60/00* (2020.01)
*B60W 10/02* (2006.01)
*B60W 50/00* (2006.01)

(52) U.S. Cl.
CPC ...... *B60W 10/024* (2020.02); *B60W 50/0097* (2013.01); *B60W 60/00274* (2020.02);
(Continued)

(58) Field of Classification Search
CPC .......... B60W 10/024; B60W 50/0097; B60W 60/00274; B60W 2554/20;
(Continued)

(56) References Cited

U.S. PATENT DOCUMENTS

2019/0311619 A1  10/2019 Tao et al.
2020/0070848 A1   3/2020 Ozer
(Continued)

FOREIGN PATENT DOCUMENTS

CN    107783537 A  *  3/2018 ........ B60W 30/0956
CN    113525340 A    10/2021

*Primary Examiner* — Edwin A Young
(74) *Attorney, Agent, or Firm* — Armstrong Teasdale LLP (57) ABSTRACT

A method may include monitoring, by a processor associated with an autonomous vehicle, a status of a traffic light. The method may include monitoring, by the processor, a movement status of at least one vehicle within a same lane as the autonomous vehicle, the at least one vehicle having a stationary position in relation to the traffic light. The method may include executing, by the processor, a computer model to predict a change of movement status for the at least one vehicle in accordance with the status of the traffic light. The method may include in response to the computer model predicting a change of movement status for the at least one vehicle from the stationary position to a moving status, instructing, by the processor, the autonomous vehicle to increase a torque value of the autonomous vehicle at a predetermined time before the change of the movement status.

20 Claims, 6 Drawing Sheets

(52) U.S. Cl.
CPC . *B60W 2510/0275* (2013.01); *B60W 2554/20* (2020.02); *B60W 2554/4045* (2020.02); *B60W 2555/60* (2020.02); *B60W 2556/10* (2020.02)

(58) Field of Classification Search
CPC ..... B60W 2554/4045; B60W 2555/60; B60W 2556/10; B60W 2510/0275
See application file for complete search history.

(56) References Cited

U.S. PATENT DOCUMENTS

| | | |
|---|---|---|
| 2020/0300648 A1 | 9/2020 | Graf et al. |
| 2021/0104024 A1 | 4/2021 | Diehl et al. |
| 2021/0300412 A1 | 9/2021 | Dingli et al. |
| 2022/0024450 A1 | 1/2022 | Roh |
| 2022/0176972 A1 | 6/2022 | Miller et al. |
| 2023/0026018 A1 | 1/2023 | Wendzel et al. |

\* cited by examiner

METHODS AND SYSTEMS FOR REDUCING VEHICLE DELAY BASED ON MOVEMENT PREDICTION

CROSS-REFERENCE TO RELATED APPLICATION

The present application is a continuation of and claims benefit of priority to U.S. Non-Provisional patent application Ser. No. 18/235,325 filed Aug. 17, 2023, the entire contents and disclosures of which are hereby incorporated by reference in its entirety.

TECHNICAL FIELD

The present disclosure relates generally to a torque control of an autonomous vehicle based on prediction of movement of one or more other vehicles.

BACKGROUND

An autonomous vehicle architecture can plan and/or control longitudinal behaviors of autonomous vehicles, but there may be a delay when an autonomous vehicle takes/starts off from behind one or more stopped vehicles at a traffic light. For example, when the light turns green, an in-vehicle fallback test (training) driver (IFTD) or a virtual driver (VD) of the autonomous vehicle may experience "sluggish starts"—e.g., the vehicle is not (immediately) moving when light turns green. In some cases, the delay may be up to a couple of seconds (e.g., 2.5 seconds) when conventional longitudinal path planning techniques are used. There is a need to eliminate or reduce such delay.

SUMMARY

The systems and methods of the present disclosure attempts to solve the problems set forth above and/or other problems in the art. For the aforementioned reasons, there is a need for a system and method for further reducing the delay and eliminating other technical shortcomings created by conventional longitudinal path planning techniques. The methods and systems described herein allow an autonomous vehicle to reduce the delay by controlling torque of the autonomous vehicle or generating longitudinal paths or trajectories of the autonomous vehicle, based on prediction of movement of other vehicles, such that a clutch (or torque converter) of the vehicle can preemptively start engaging the powertrain ahead of a movement requested by a longitudinal path that is generated by a path planner of the vehicle.

In one embodiment, a method may include monitoring, by a processor associated with an autonomous vehicle, a status of a traffic light. The method may include monitoring, by the processor, a movement status of at least one vehicle within a same lane as the autonomous vehicle, the at least one vehicle having a stationary position in relation to the traffic light. The method may include executing, by the processor, a computer model to predict a change of movement status for the at least one vehicle in accordance with the status of the traffic light. The method may include in response to the computer model predicting a change of movement status for the at least one vehicle from the stationary position to a moving status, instructing, by the processor, the autonomous vehicle to increase a torque value of the autonomous vehicle at a predetermined time before the change of the movement status.

In another embodiment, a system may include one or more processors and a non-transitory computer readable medium containing instructions that are executed by the one or more processors associated with an autonomous vehicle. The instructions may cause the one or more processors to monitor a movement status of at least one vehicle within a same lane as the autonomous vehicle, the at least one vehicle having a stationary position in relation to the traffic light. The instructions may cause the one or more processors to execute a computer model to predict a change of movement status for the at least one vehicle in accordance with the status of the traffic light. In response to the computer model predicting a change of movement status for the at least one vehicle from the stationary position to a moving status, the instructions may cause the one or more processors to instruct the autonomous vehicle to increase a torque value of the autonomous vehicle at a predetermined time before the change of the movement status.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting and it may be readily understood that certain aspects of the disclosed systems and methods can be variously arranged and combined, all of which arrangements and combinations are contemplated by this disclosure.

Embodiments herein generally describe a prediction-based path generation system or an autonomous vehicle and methods of use thereof. According to some embodiments, a method may include monitoring, by a processor associated with an autonomous vehicle, a status of a traffic light. The method may include monitoring, by the processor, a movement status of at least one vehicle within a same lane as the autonomous vehicle, the at least one vehicle having a stationary position in relation to the traffic light. The method may include executing, by the processor, a computer model to predict a change of movement status for the at least one vehicle in accordance with the status of the traffic light. The method may include in response to the computer model predicting a change of movement status for the at least one vehicle from the stationary position to a moving status, instructing, by the processor, the autonomous vehicle to increase a torque value of the autonomous vehicle at a predetermined time before the change of the movement status.

In one aspect, with an autonomous vehicle architecture in which longitudinal behaviors of autonomous vehicles can be planned and/or controlled, there may be a delay when an autonomous vehicle takes/starts off from behind one or more stopped vehicles at a traffic light. For example, when the light turns green, an in-vehicle fallback test (training) driver (IFTD) or a virtual driver (VD) of the autonomous vehicle may experience "sluggish starts" e.g., the vehicle is not (immediately) moving when light turns green. There is a need to eliminate or reduce such delay in this scenario. In some cases, the delay may be up to a couple of seconds (e.g., 2.5 seconds approximately). For example, when a traffic light turns green, the driver of a car in front of an autonomous vehicle can notice the light has changed, and may accelerate enough that the autonomous vehicle can start predicting a moving trajectory for the car in front, which can take up to (1) 0.5 seconds, for example. Then, a longitudinal planner of the autonomous vehicle may generate a new longitudinal path for the vehicle to move, which can take up to (2) 0.5 seconds, for example, if the planner generates a new path every 0.5 seconds. In response to generation of the new longitudinal path, a motion controller of the autonomous vehicle may request acceleration from a powertrain of the autonomous vehicle, and after (3) 1.5 seconds (for engaging a clutch with the powertrain), the vehicle may start moving. In this scenario, the delay may be approximately up to 2.5 seconds (the sum of the delays (1), (2), (3).

In some approach, the autonomous vehicle can perform an early prediction of the movement of the car in front using a machine learning model that may incorporate a traffic light state. However, such early prediction would only save 0.5 seconds (e.g., the delay (1)), but the IFTD or VD of the autonomous vehicle may still suffer from 2 seconds of delay (the sum of the delays (2) and (3)). There is a need for a system and method for further reducing the delay and eliminating other technical shortcomings created by conventional longitudinal path planning techniques.

To solve this problem, according to certain aspects, embodiments in the present disclosure relate to controlling torque of an autonomous vehicle or generating longitudinal paths or trajectories of the autonomous vehicle, based on prediction of movement of other vehicles, such that a clutch (or torque converter) of the vehicle can preemptively start engaging the powertrain before a movement is requested by a longitudinal path that is generated by a path planner of the vehicle. In this manner, the delay (3) for engaging the clutch with the powertrain can be removed.

In an example scenario, an autonomous vehicle is stopped behind (e.g., within the same lane or the next lane) one or more other vehicles (e.g., a first vehicle in the same lane, a second vehicle in the next lane) which are stopped at a traffic light. There are one or more brake lights on the back of each vehicle.

In some embodiments, a prediction-based path generation system of an autonomous vehicle may include one or more sensors, map (e.g., HD map), a path planner, and/or a motion controller. The path planner may include a constraint generator and/or a path generator. The constraint generator may generate/consolidate constraints based on sensor data and/or map data, and send the constraints to the path generator. The path generator may generate, based on the one or more constraints, a target path, and send out the target path to the motion controller so that the motion controller can execute the target path/trajectory. In some embodiments, the path planner may include a preemptive torque controller configured to preemptively generate or produce a torque value of the vehicle by predicting movement of one or more other vehicles (e.g., first vehicle, second vehicle). In some embodiments, the prediction-based path generation system may include a traffic light detector configured to detect that the traffic light has changed from red to green, a movement predictor configured to predict movement of the one or more other vehicles, and/or an actual movement detector configured to detect movement of the one or more other vehicles at a predicted time. The path planner (and components thereof) may be a software module, which may be executed by one or more processors.

In response to the traffic light detector detecting that the traffic light turns green, the traffic light detector may trigger the movement predictor to predict movement of the one or more other vehicles (e.g., predicting a movement time of the first vehicle or the second vehicle which is stopped currently). In response to the movement predictor predicting a movement time, the movement predictor may generate a request for starting preemptive powertrain engagement to the path generator. In response to the preemptive powertrain engagement start request, the path generator may generate a request for releasing a clutch (or torque convertor) to engage the clutch with the powertrain, and send the request to the transmission control of the motion controller. In this manner, the preemptive torque controller can preemptively initiate a drive-off of the autonomous vehicle at a predetermined time (e.g., 1.5 seconds) before the predicted movement time so that the powertrain can be already engaged when the one or more other vehicles are ready to move, thereby removing/reducing the delay for engaging the clutch with the powertrain.

In response to the movement predictor predicting a movement time, the movement predictor may send the predicted movement time to the actual movement detector so that the actual movement detector can check/determine, based on the sensor data, whether the one or more other vehicles actually move at the predicted movement time. In response to determining that the one or more other vehicles do not move at the predicted movement time, the actual movement detector may generate a request for cancelling preemptive powertrain engagement to the path generator. In response to the preemptive powertrain engagement cancellation request, the path generator may generate a request for pressing a clutch (or torque convertor) to disengage the clutch from the powertrain and stepping on the brake, and send the request to the transmission control and the brake control of the motion controller. In this manner, if the one or more other vehicles in front do not move as predicted, the preemptive torque controller can abort or cancel the powertrain engagement by opening the clutch and stepping on the brake. This method of aborting/cancelling the preemptive powertrain engagement can help the autonomous vehicle to plan a path in both traffic light scenarios and stop and go traffic scenarios. This method of aborting/cancelling the preemptive powertrain engagement can avoid wear and tear of powertrain/fuel engagement components.

In some embodiments, the movement predictor may predict movement of the one or more other vehicles using a movement prediction model. The movement prediction model may use an extrapolation of one or more movement characteristics of the one or more other vehicles. The one or more movement characteristics may include at least one of (1) the status/state of the traffic light (e.g., turning green), (2) vehicle movement history, (3) what the speed limit is, (4) what direction the vehicles are facing, (5) whether there is somebody or something in front of the vehicles or not, (6) whether the vehicles are predicted to make a lane change or turn, or (7) whether the drivers of the vehicles press the brakes or not (which can be detected from the brake lights). The movement predictor may obtain the one or more movement characteristics from at least one of location data (e.g., from the map data), historical data (e.g., historical data associated with the traffic light, or historical data associated with the location) or sensor data. In some embodiments, the movement prediction model may use location data and historical data associated with the traffic light to predict the change of status of the traffic light. In some embodiments, the movement predictor may receive the location data and/or historical data from an external server based on the current location of the autonomous vehicle (e.g., using a global positioning system (GPS)) and customize/modify the one or more movement characteristics based on the current location of the autonomous vehicle. In some embodiments, instead of being triggered by the change of the status of the traffic light (e.g., the traffic light turns green), the movement predictor may start predicting movement of the one or more other vehicles based on at least one of the current locations of the autonomous vehicle, location data, and/or historical data.

In some embodiments, the movement prediction model may be an artificial intelligence model to predict one or more attributes of the one or more other vehicles. The artificial intelligence model may be configured to ingest data from at least one sensor of the autonomous vehicle and predict the attributes of the one or more other vehicles. In an embodiment, the artificial intelligence module is configured to predict a plurality of predetermined attributes of each of the one or more other vehicles relative to the autonomous vehicle. The predetermined attributes may include attributes relating to whether and/or when each vehicle starts moving. In an embodiment, the artificial intelligence model is a predictive machine learning model that may be continuously trained using updated data, e.g., data including at least one of (1) the status/state of the traffic light, (2) vehicle movement history, (3) what the speed limit is, (4) what direction the vehicles are facing, (5) whether there is somebody or something in front of the vehicles or not, (6) whether the vehicles are predicted to make a lane change or turn, or (7) whether the drivers of the vehicles press the brakes or not. In various embodiments, the artificial intelligence model may employ any class of algorithms that are used to understand relative factors contributing to an outcome, estimate unknown outcomes, discover trends, and/or make other estimations based on a data set of factors collected across prior trials. In an embodiment, the artificial intelligence model may refer to methods such as logistic regression, decision trees, neural networks, linear models, and/or Bayesian models.

In some embodiments, a prediction-based path generation system of an autonomous vehicle may include one or more sensors, map (e.g., HD map), a path planner, and/or a motion controller. The path planner may include a constraint generator and/or a path generator. The constraint generator may generate/consolidate constraints based on sensor data and/or map data, and send the constraints to the path generator. In some embodiments, the constraint generator may include a plurality of specific constraint generators configured to respectively generate a plurality of constraints, and a constraints aggregator configured to aggregate constraints that are generated from the plurality of specific constraint generators. Each specific constraint generator can add or remove a constraint to or from the constraints aggregator so that the constraints aggregator can aggregate the outstanding constraints and output the aggregated constraints to the path generator. The path generator may generate, based on the aggregated constraints, a target path, and send out the target path to the motion controller so that the motion controller can execute the target path/trajectory. The plurality of specific constraint generators may include a traffic constraint generator configured to generate one or more traffic light constraints (e.g., stopping at a red light). In some embodiments, the traffic constraint generator may include a traffic light detector configured to detect/monitor the status/state of a traffic light, a movement predictor configured to predict movement of the one or more other vehicles (e.g., first vehicle, second vehicle), and/or an actual movement detector configured to detect movement of the one or more other vehicles at a predicted time. In some embodiments, upon detecting a red light, the traffic light detector may add a traffic light constraint (e.g., stopping at the red light) to the constraints aggregator, and upon detecting a green light, the traffic light detector may remove the traffic light constraint from the constraints aggregator. In some embodiments, upon detecting a red light, the traffic light detector may trigger an actual movement detector such that the actual movement detector may determine whether there are one or more other vehicles (e.g., first vehicle, second vehicle). In response to determining that there are one or more other vehicles, the actual movement detector may add a stationary vehicle constraint to the constraints aggregator. The movement predictor may be configured to preemptively generate or produce a torque value of the vehicle by predicting movement of one or more other vehicles (e.g., first vehicle, second vehicle). The path planner (and components thereof) may be a software module, which may be executed by one or more processors.

In response to the traffic light detector detecting that the traffic light turns green, the traffic light detector may trigger the movement predictor to predict movement of the one or more other vehicles (e.g., predicting a movement time of the first vehicle or the second vehicle which is stopped currently). In response to the movement predictor predicting a movement time, the movement predictor may remove the stationary vehicle constraint (which has been added by the actual movement detector upon the light turning red) from the constraints aggregator. In this manner, the path planner can react to the removal of the stationary vehicle constraint by requesting an execution of the target path (e.g., moving in a way that would violate the current traffic conditions, such as there are one or more stationary vehicles ahead) by knowing that the actual movement of the autonomous vehicle would not violate the future constraints. For example, when the constraints aggregator sends the outstanding constraints (without the stationary vehicle constraint) to the path generator, the path generator may cause the motion controller to execute the target path by immediately releasing a clutch (or torque convertor) to engage the clutch with the powertrain. In this manner, the traffic constraint generator can preemptively initiate a drive-off of the autonomous vehicle at a predetermined time (e.g., 1.5 seconds) before the predicted movement time so that the powertrain can be already engaged when the one or more other vehicles are ready to move, thereby removing/reducing the delay for engaging the clutch with the powertrain.

In response to the movement predictor predicting a movement time, the movement predictor may send the predicted movement time to the actual movement detector so that the actual movement detector can check/determine, based on the sensor data, whether the one or more other vehicles actually move at the predicted movement time. In response to determining that the one or more other vehicles do not move at the predicted movement time, the actual movement detector may add a stationary vehicle constraint back to the constraints aggregator. For example, when the constraints aggregator sends the outstanding constraints to the path generator, the path generator may cause the motion controller (e.g., the transmission control and the brake control of the motion controller) to step on the brake by disengaging a clutch (or torque convertor) from the powertrain. In this manner, if the one or more other vehicles in front do not move as predicted, the path generator can cause the powertrain engagement to be aborted by opening the clutch and stepping on the brake.

In some embodiments, the movement predictor may predict movement of the one or more other vehicles using a movement prediction model. The movement prediction model may use an extrapolation of one or more movement characteristics of the one or more other vehicles. The one or more movement characteristics may include at least one of (1) the status/state of the traffic light (e.g., turning green), (2) vehicle movement history, (3) what the speed limit is, (4) what direction the vehicles are facing, (5) whether there is somebody or something in front of the vehicles or not, (6) whether the vehicles are predicted to make a lane change or turn, or (7) whether the drivers of the vehicles press the brakes or not (which can be detected from the brake lights). The movement predictor may obtain the one or more movement characteristics from at least one of location data (e.g., from the map data), historical data (e.g., historical data associated with the traffic light, or historical data associated with the location) or sensor data. In some embodiments, the movement prediction model may use location data and historical data associated with the traffic light to predict the change of status of the traffic light. In some embodiments, the movement predictor may receive the location data and/or historical data from an external server based on the current location of the autonomous vehicle (e.g., using a GPS) and customize/modify the one or more movement characteristics based on the current location of the autonomous vehicle. In some embodiments, instead of being triggered by the change of the status of the traffic light (e.g., the traffic light turns green), the movement predictor may start predicting movement of the one or more other vehicles based on at least one of the current location of the autonomous vehicle, location data, and/or historical data.

In some embodiments, the movement prediction model may be an artificial intelligence model to predict one or more attributes of the one or more other vehicles. The artificial intelligence model may be configured to ingest data from at least one sensor of the autonomous vehicle and predict the attributes of the one or more other vehicles. In an embodiment, the artificial intelligence module is configured to predict a plurality of predetermined attributes of each of the one or more other vehicles relative to the autonomous vehicle. The predetermined attributes may include attributes relating to whether and/or when each vehicle starts moving. In an embodiment, the artificial intelligence model is a predictive machine learning model that may be continuously trained using updated data, e.g., data including at least one of (1) the status/state of the traffic light, (2) vehicle movement history, (3) what the speed limit is, (4) what direction the vehicles are facing, (5) whether there is somebody or something in front of the vehicles or not, (6) whether the vehicles are predicted to make a lane change or turn, or (7) whether the drivers of the vehicles press the brakes or not. In various embodiments, the artificial intelligence model may employ any class of algorithms that are used to understand relative factors contributing to an outcome, estimate unknown outcomes, discover trends, and/or make other estimations based on a data set of factors collected across prior trials. In an embodiment, the artificial intelligence model may refer to methods such as logistic regression, decision trees, neural networks, linear models, and/or Bayesian models.

In some embodiments, a system may include one or more processors associated with an autonomous vehicle. The one or more processors may be configured to monitor a movement status of at least one vehicle within a same lane as the autonomous vehicle, the at least one vehicle having a stationary position in relation to the traffic light. The one or more processors may be configured to execute a computer model to predict a change of movement status for the at least one vehicle in accordance with the status of the traffic light. In response to the computer model predicting a change of movement status for the at least one vehicle from the stationary position to a moving status, one or more processors may be configured to instruct the autonomous vehicle to increase a torque value of the autonomous vehicle at a predetermined time before the change of the movement status.

In some embodiments, in instructing the autonomous vehicle to increase the torque value, the one or more processors may be configured to instruct the autonomous vehicle to release a clutch of the autonomous vehicle. The predetermined time may correspond to a time to release the clutch of the autonomous vehicle.

In some embodiments, the one or more processors may be further configured to instruct the autonomous vehicle to activate a powertrain engagement mechanism. The predetermined time may correspond to a time to activate the powertrain engagement of the autonomous vehicle.

In some embodiments, the computer model may be a machine learning model trained to predict an estimated time for a status change of the traffic light or the change of movement status. In some embodiments, the computer model may use location data and historical data associated with the traffic light to predict the change of status.

In some embodiments, in monitoring the movement status of the at least one vehicle, the one or more processors may be configured to monitor a brake light associated with the at least one vehicle. In some embodiments, the one or more processors may be further configured to determine whether the movement status for the at least one vehicle changes from the stationary position to the moving status at a time of the predicted change of movement status. In response to determining that the movement status for the at least one vehicle does not change from the stationary position to the moving status at the time of the predicted change of movement status, the one or more processors may be further configured to instruct the autonomous vehicle to stop increasing the torque value of the autonomous vehicle.

In some embodiments, the one or more processors may be further configured to control the autonomous vehicle to satisfy one or more constraints relating to movement of the autonomous vehicle, including a traffic light constraint. In response to the computer model predicting the change of movement status for the at least one vehicle from the stationary position to the moving status, the one or more processors may be further configured to determine whether the predicted change of movement status satisfies the traffic light constraint. In response to determining that the predicted change of movement status satisfies the traffic light constraint, the one or more processors may be further configured to remove the traffic light constraint from the one or more constraints.

Embodiments in the present disclosure have at least the following advantages and benefits. Embodiments in the present disclosure can provide useful techniques for controlling torque of an autonomous vehicle based on prediction of movement of other vehicles in front of the autonomous vehicle at a traffic light, such that a clutch (or torque converter) of the vehicle can preemptively start engaging the powertrain at a predetermined time (e.g., 1.5 seconds) before a path planner of the vehicle generates a new longitudinal path for the vehicle to move. In this manner, when a traffic light turns green, the delay for engaging the clutch with the powertrain can be removed.

Figure 1:
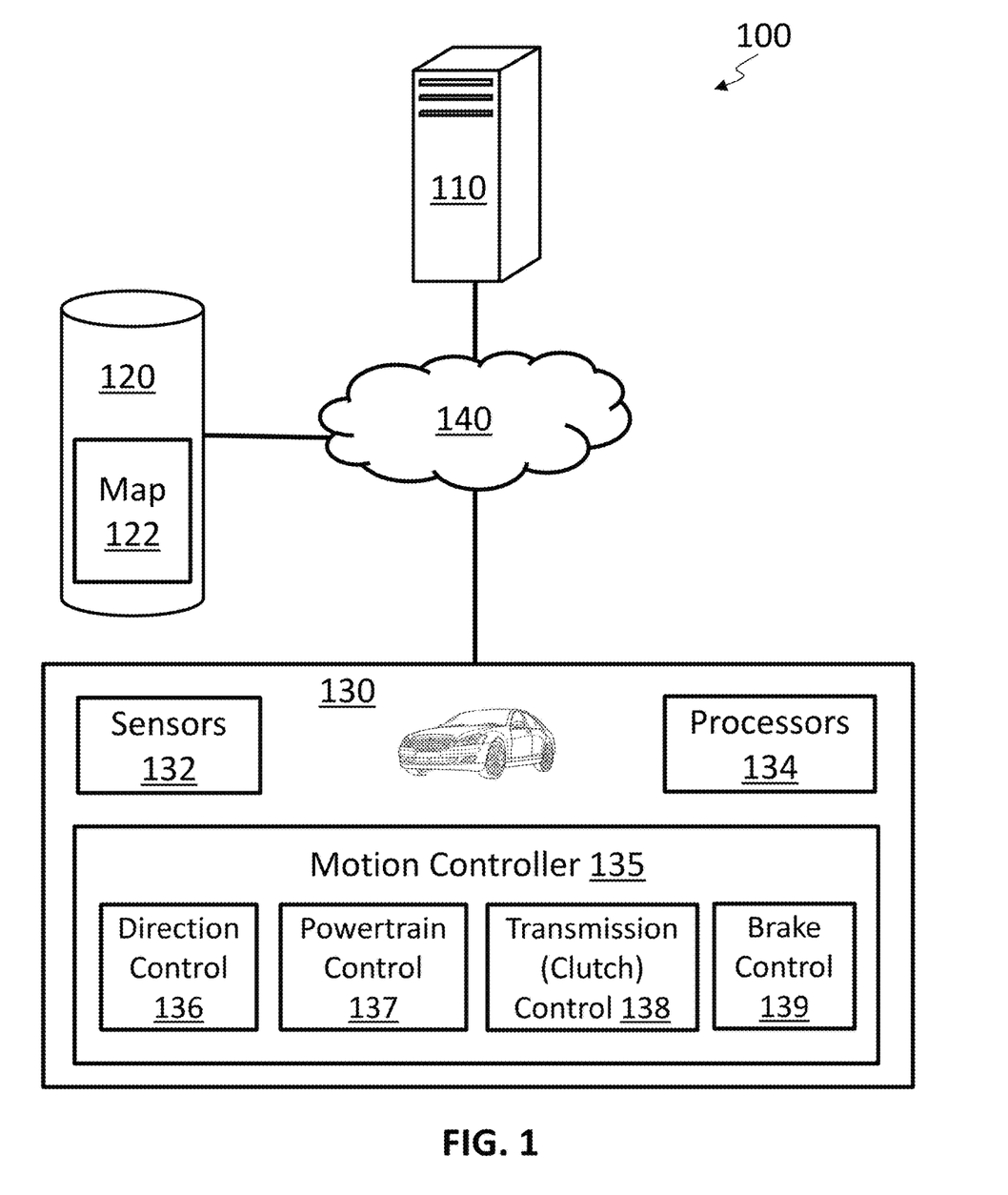
FIG. 1 depicts a system diagram of an autonomous vehicle control system, according to an embodiment.

FIG. 1 is a non-limiting example of components of an autonomous vehicle control system 100 in which a server 110 operates. The server 110 may utilize features described in FIG. 1 to generate and/or revise one or more maps (e.g., HD maps 122) using one or more sensors of an autonomous vehicle 130. The system 100 is not confined to the components described herein and may include additional or other components not shown for brevity, which are to be considered within the scope of the embodiments described herein.

The features depicted in FIG. 1 may be connected through a network 140. The examples of the network 140 may include, but are not limited to, private or public LAN, WLAN, MAN, WAN, and the Internet. The network 140 may include both wired and wireless communications according to one or more standards and/or via one or more transport mediums.

The communication over the network 140 may be performed in accordance with various communication protocols such as Transmission Control Protocol and Internet Protocol (TCP/IP), User Datagram Protocol (UDP), and IEEE communication protocols. In one example, the network 140 may include wireless communications according to Bluetooth specification sets or another standard or proprietary wireless communication protocol. In another example, the network 140 may include communications over a cellular network, including, e.g., a GSM (Global System for Mobile Communications), CDMA (Code Division Multiple Access), and/or EDGE (Enhanced Data for Global Evolution) network.

The server 110 may be any computing device comprising a processor and non-transitory, machine-readable storage capable of executing the various tasks and processes described herein. The server 110 may employ various processors such as a central processing unit (CPU) and graphics-processing unit (GPU), among others. Non-limiting examples of such computing devices may include workstation computers, laptop computers, server computers, and the like. While the system 100 includes a single server 110, the server 110 may include any number of computing devices operating in a distributed computing environment, such as a cloud environment.

The server 110 may be associated with an autonomy system that uses various methods to provide autonomous vehicle navigation for one or more autonomous vehicles 130. In some embodiments, the autonomous vehicles may use an HD map that is stored in a data repository, such as a database 120. The database 120 may be any data repository (e.g., relational database) configured to store data, such as the HD map 122. The database 120 may be in communication with the server 110, such that the data records are stored within the database 120. As used herein an HD map refers to any map that can be used by an autonomous vehicle for navigational purposes.

The system 100 may also include an autonomous vehicle 130. The autonomous vehicle 130 may include one or more sensors (e.g., represented by the sensor 132) that can sense data relating to the vehicle's surrounding environment (e.g., lane markings, traffic lights, and/or static/dynamic objects within the surrounding environment). The sensor 132 may include at least one of cameras, radars, and/or LIDARs.

The autonomous vehicle 130 may include a processor 134 that can communicate with the sensor 132 and the server 110. The processor 134 may use a Global Navigation Satellite System (GNSS) to identify the location of the vehicle and/or objects or lane markings within the vehicle's surrounding environment. For instance, the processor 134 may use any network of satellites that transmit signals to GPS (Global Positioning System) receivers of the autonomous vehicle 130 and/or the processor 134. The processor 134 may use these signals to determine the receiver's precise location, velocity, and time. The processor 134 may use a communication module configured to communicate with the server 110. For instance, the processor 134 may include antennas or any other wired/wireless communication protocol or apparatus to communicate with the server 110.

The processor 134 may control torque of the vehicle 130 based on prediction of movement of one or more other vehicles. The processor 134 may generate longitudinal paths or trajectories that satisfy constraints in the form of distance-time, velocity-time, and/or velocity-distance profiles, for example, based on prediction of movement of one or more other vehicles. Details of the prediction-based torque control or the prediction-based longitudinal path generation will be described with reference to FIG. 2 to FIG. 6.

The autonomous vehicle 130 may include a motion controller 135 that can control the longitudinal, lateral and vertical dynamics of the vehicle 130. The motion controller 135 may perform a direction control 136, a powertrain control 137, a transmission (clutch) control 138, and/or a brake control 139. The motion controller 136 may control the optimal driving strategy and/or the optimal interaction of all actuators in the vehicle 130. In some embodiments, the motion controller 135 may be implemented in an electronic control unit (ECU). In some embodiments, the motion controller 135 may be a software module, which may be executed by one or more processors. The direction control 136 may include one or more actuators and/or sensors for controlling and receiving feedback from the direction or steering components to enable the vehicle 130 to follow a desired trajectory. The powertrain control 137 may be configured to control the output of a powertrain (e.g., output power of one or more internal combustion engines or one or more motors). The transmission control 138 may be configured to control a gear and/or a clutch in a drivetrain, etc., thereby controlling a speed of the vehicle 130. For example, the transmission control 138 may be configured to increase a torque value of the vehicle 130 by releasing a clutch of the vehicle 130, engaging the clutch with the powertrain of the vehicle 130, or activating a powertrain engagement mechanism of the vehicle 130 (e.g., gearbox or gear engagement system). In some embodiments, the clutch may include, or be replaced by, a torque converter. The brake control 139 may be configured to control one or more brakes that slow or stop the vehicle 139, e.g., disk or drum brakes coupled to the wheels of the vehicle.

Figure 2:
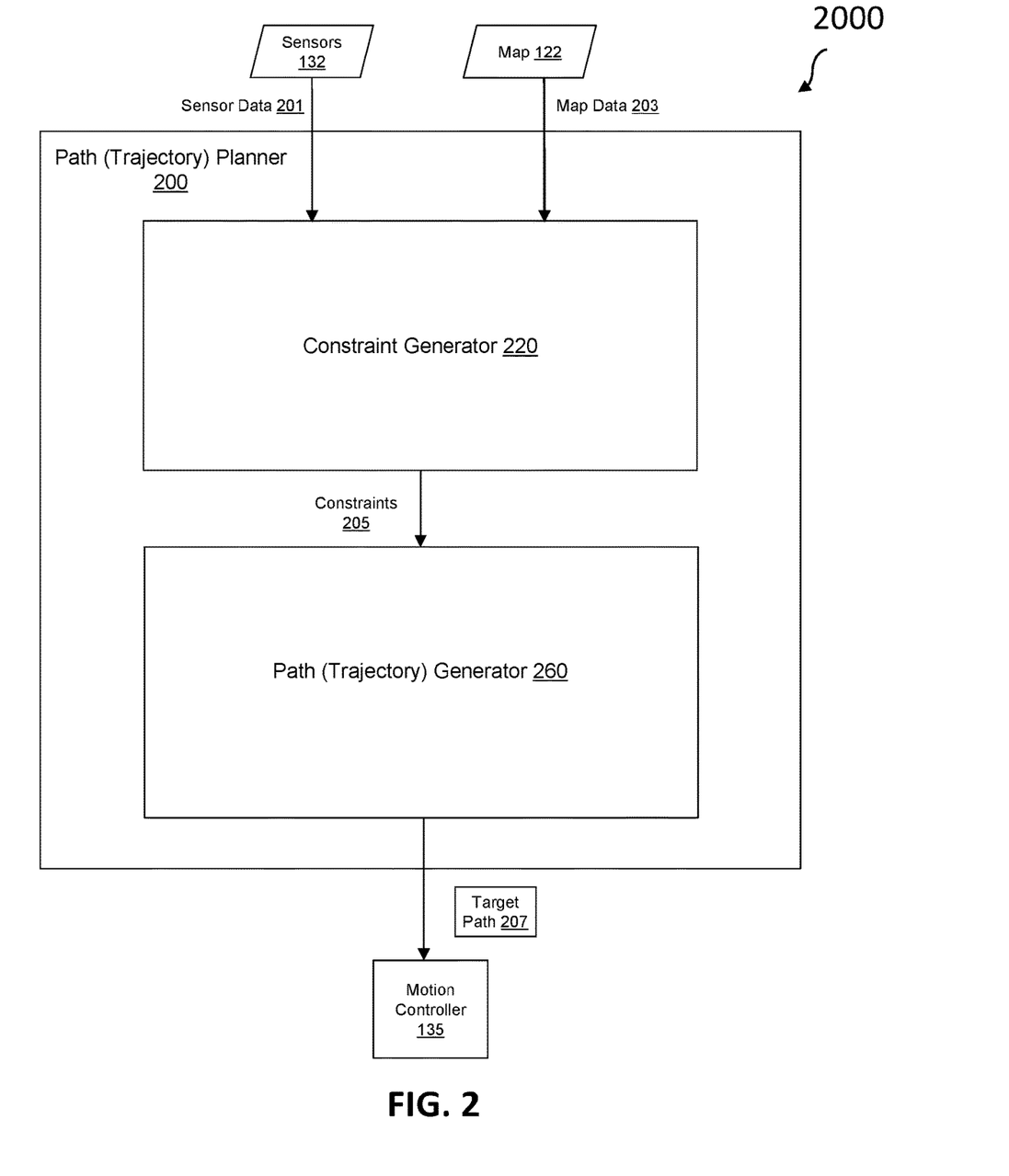
FIG. 2 illustrates a block diagram of generating a path (trajectory) using a path generation system, according to an embodiment.

FIG. 2 illustrates a block diagram of generating a path (trajectory) using a path generation system 2000, according to an embodiment. In some embodiments, path generation system 2000 may include one or more sensors 132, map 122 (e.g., HD map), a path planner 200, and/or a motion controller 135. The path planner 200 may be a software module, which may be executed by one or more processors (e.g., processor 134 in FIG. 1). The path generation system 2000 may generate longitudinal paths or trajectories that satisfy constraints in the form of distance-time, velocity-time, and/or velocity-distance profiles, for example. Longitudinal paths or trajectories may relate to vehicle forward motions including stopping. The path planner 200 may ultimately generate a target path or trajectory 207 for a vehicle (e.g., vehicle 130 in FIG. 1) which specifies/represents a change in distance, velocity, and/or acceleration over time, and send the generated target path/trajectory 259 to the motion controller 135 to control the vehicle to move forward and/or stop if necessary. In some embodiments, the path planner 200 may include a constraint generator 220 and/or a path generator 260.

The constraint generator 220 may receive sensor data 201 from the one or more sensors 132 (e.g., cameras, radar, light detection and ranging (LIDAR) sensors), and map data 203 from maps (e.g., HD maps for navigation from the server 110 or database 120). The constraint generator 220 may generate/consolidate constraints 205 and send the constraints 205 to the path generator 260. The one or more constraints 205 may include information in the form of constraints over time. The one or more constraints 205 may include one or more physical constraints (e.g., a detected obstacle ahead of the vehicle, a red light ahead of the vehicle), distance-time constraints (e.g., moving forward in x meters in y seconds), velocity-time constraints (e.g., having a particular velocity in y seconds), and/or velocity-distance constraints (e.g., having a particular velocity after moving forward in x meters). The path generator 260 may generate, based on the one or more constraints 205, a target path 207 and send out the target path 207 to the motion controller 135 so that the motion controller 135 can execute the target path/trajectory 207. In some embodiments, the target path 207 may specify (1) a desired distance, velocity, and/or acceleration over time, or (2) a change/profile in distance, velocity, and/or acceleration over time. In response to receiving the target path 207, the motion controller 135 can perform at least one of the direction control 136, powertrain control 137, transmission control 138, or brake control 139 to execute the target path 207. For example, the motion controller 135 can initially or immediately perform the transmission control 138 to increase a torque value of the vehicle by releasing a clutch of the vehicle 130, engaging the clutch with the powertrain of the vehicle 130, or activating a powertrain engagement mechanism of the vehicle 130. The motion controller 135 then can perform the direction control 136, powertrain control 137, and/or brake control 139 to execute the target path 207. The path planner 200 may produce a new target trajectory at a rate (e.g., every 0.5 seconds or 2 Hz) in order to react to changes in the environment.

Figure 3:
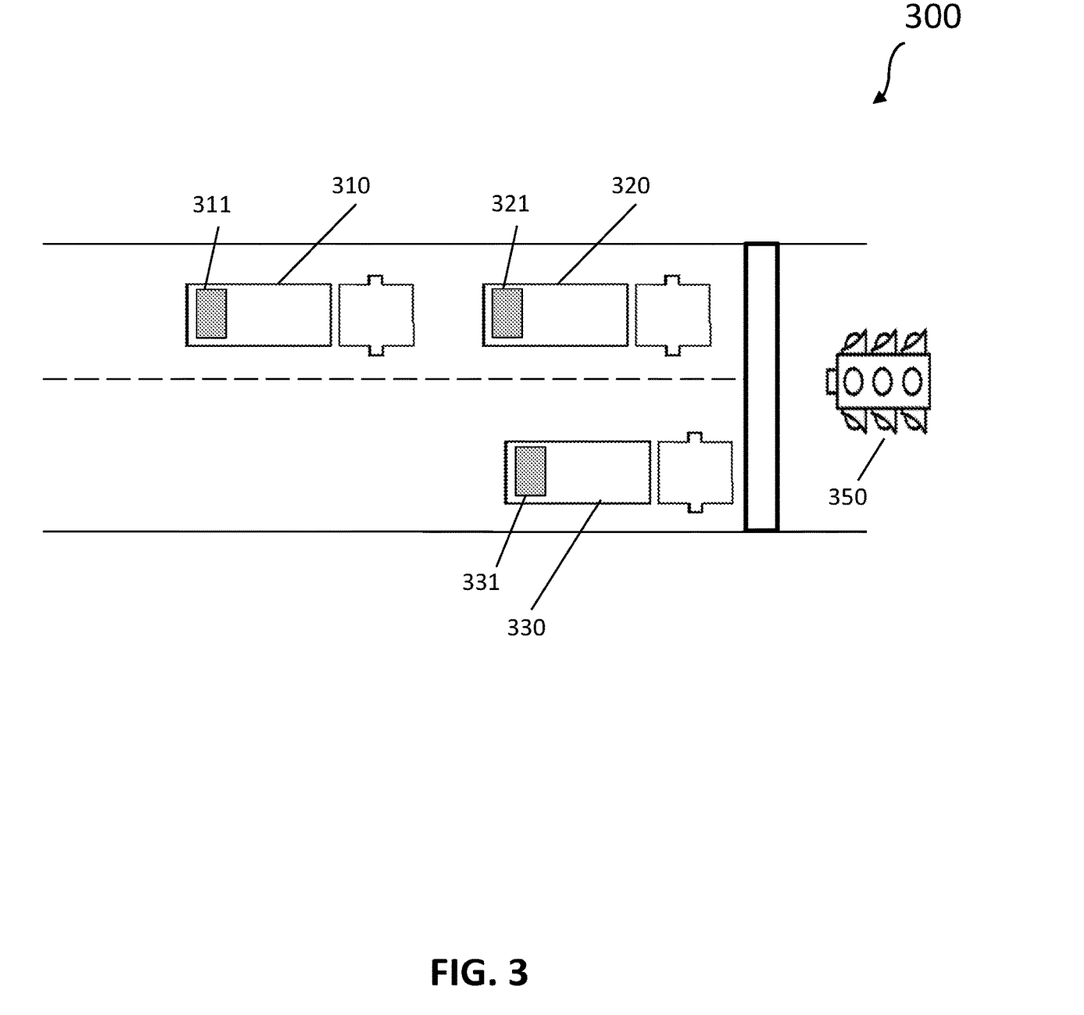
FIG. 3 illustrates a diagram of vehicles at a traffic light, according to an embodiment.

FIG. 3 illustrates a diagram 300 of vehicles 310, 320, 330 at a traffic light 350, according to an embodiment. In an example scenario, an autonomous vehicle 310 is stopped behind (e.g., within the same lane or the next lane) one or more other vehicles (e.g., a first vehicle 320 in the same lane, a second vehicle 330 in the next lane) which are stopped at the traffic light 350. There are one or more brake lights 311, 321, 331 on the back of each vehicle.

Figure 4:
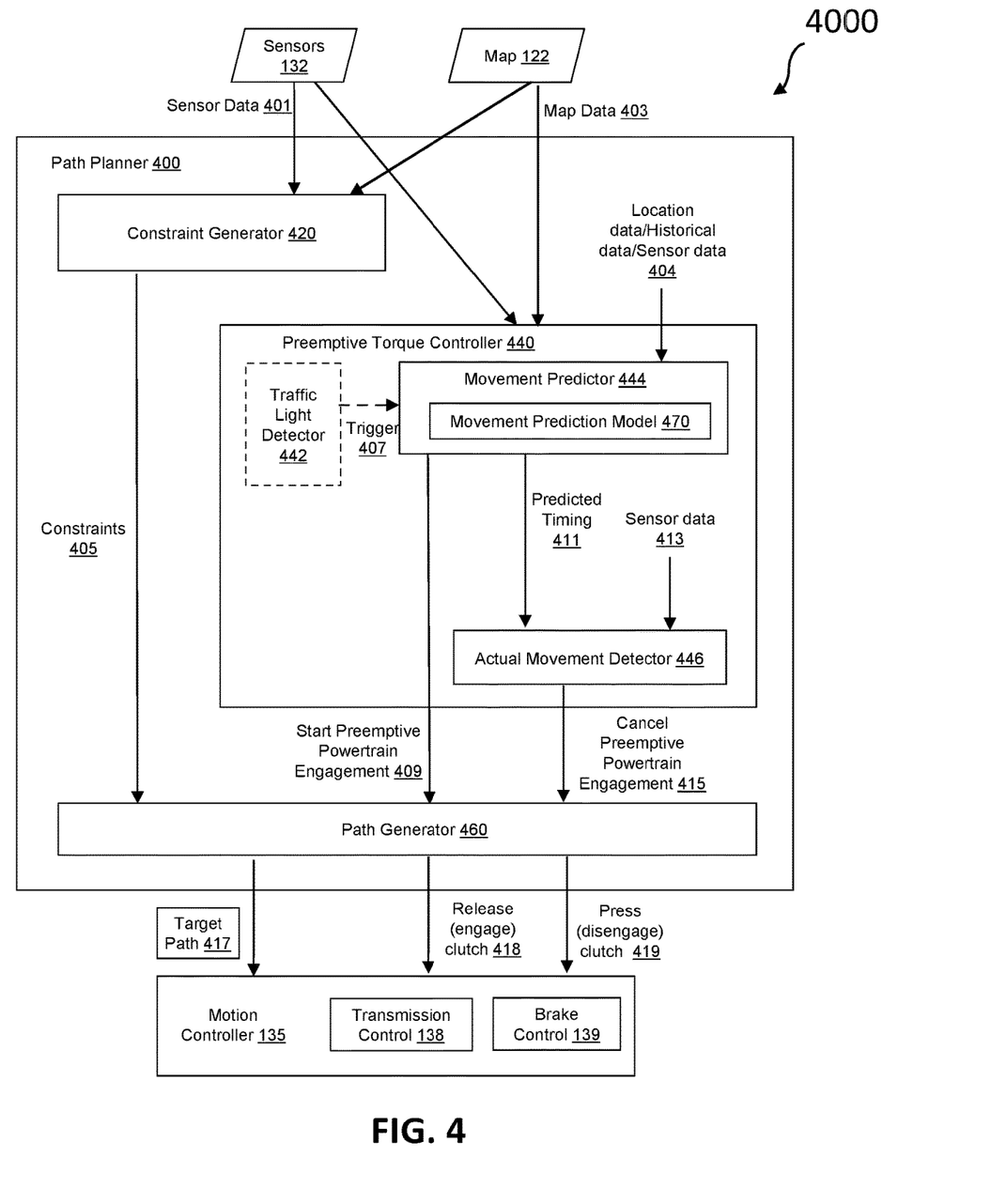
FIG. 4 illustrates a block diagram of controlling torque of an autonomous vehicle using a prediction-based path generation system, according to an embodiment.

FIG. 4 illustrates a block diagram of controlling torque of an autonomous vehicle using a prediction-based path generation system 4000, according to an embodiment.

In some embodiments, the prediction-based path generation system 4000 of an autonomous vehicle (e.g., autonomous vehicle 310) may include one or more sensors 132, map 122 (e.g., HD map), a path planner 400, and/or a motion controller 135. The path planner 400 may include a constraint generator 420 and/or a path generator 406. The constraint generator 420 may generate/consolidate constraints based on sensor data 401 and/or map data 403, and send the constraints 405 to the path generator 460. The path generator 460 may generate, based on the one or more constraints 405, a target path 417, and send out the target path 417 to the motion controller 135 so that the motion controller 135 can execute the target path/trajectory 417. In some embodiments, the path planner 400 may include a preemptive torque controller 440 configured to preemptively generate or produce a torque value of the vehicle by predicting movement of one or more other vehicles (e.g., first vehicle 320, second vehicle 330). The preemptive torque controller 440 may include a traffic light detector 442 configured to detect that the traffic light (e.g., traffic light 350) has changed from red to green, a movement predictor 444 configured to predict movement of the one or more other vehicles, and/or an actual movement detector 446 configured to detect movement of the one or more other vehicles at a predicted time 411. The path planner 400 (and components thereof) may be a software module, which may be executed by one or more processors.

In response to the traffic light detector 442 detecting that the traffic light turns green, the traffic light detector 442 may trigger 407 the movement predictor 444 to predict movement of the one or more other vehicles (e.g., predicting a movement time of the first vehicle 320 or the second vehicle 330 which is stopped currently). In response to the movement predictor 444 predicting a movement time 411, the movement predictor 444 may generate a request 409 for starting preemptive powertrain engagement to the path generator 460. In response to the preemptive powertrain engagement start request 409, the path generator 460 may generate a request 418 for releasing a clutch (or torque convertor) to engage the clutch with the powertrain, and send the request 418 to the transmission control 138 of the motion controller 135. In this manner, the preemptive torque controller 440 can preemptively initiate a drive-off of the autonomous vehicle at a predetermined time (e.g., 1.5 seconds) before the predicted movement time 411 so that the powertrain can be already engaged when the one or more other vehicles are ready to move, thereby removing/reducing the delay for engaging the clutch with the powertrain.

In response to the movement predictor 444 predicting a movement time 411, the movement predictor 444 may send the predicted movement time 411 to the actual movement detector 446 so that the actual movement detector 446 can check/determine, based on the sensor data 413, whether the one or more other vehicles actually move at the predicted movement time 411. In response to determining that the one or more other vehicles do not move at the predicted movement time 411, the actual movement detector 446 may generate a request 415 for cancelling preemptive powertrain engagement to the path generator 460. In response to the preemptive powertrain engagement cancellation request 415, the path generator 460 may generate a request 419 for pressing a clutch (or torque convertor) to disengage the clutch from the powertrain and stepping on the brake, and send the request 419 to the transmission control 138 and/or the brake control 139 of the motion controller 135. In this manner, if the one or more other vehicles in front do not move as predicted, the preemptive torque controller 440 can abort or cancel the powertrain engagement by opening the clutch and stepping on the brake. This method of aborting/cancelling the preemptive powertrain engagement can help the autonomous vehicle to plan a path in both traffic light scenarios and stop and go traffic scenarios. This method of aborting/cancelling the preemptive powertrain engagement can avoid wear and tear of powertrain/fuel engagement components.

Referring to FIG. 4, the movement predictor 444 may predict movement of the one or more other vehicles using a movement prediction model 470. The movement prediction model 470 may use an extrapolation of one or more movement characteristics of the one or more other vehicles. The one or more movement characteristics may include at least one of (1) the status/state of the traffic light (e.g., turning green), (2) vehicle movement history, (3) what the speed limit is, (4) what direction the vehicles are facing, (5) whether there is somebody or something in front of the vehicles or not, (6) whether the vehicles are predicted to make a lane change or turn, or (7) whether the drivers of the vehicles press the brakes or not (which can be detected from the brake lights 321, 331). The movement predictor 444 may obtain the one or more movement characteristics from data 404 including at least one of location data (e.g., from the map data), historical data (e.g., historical data associated with the traffic light, or historical data associated with the location) or sensor data. In some embodiments, the movement prediction model 470 may use location data and historical data associated with the traffic light to predict the change of status of the traffic light. In some embodiments, the movement predictor 444 may receive the location data and/or historical data from an external server (e.g., server 110) based on the current location of the autonomous vehicle (e.g., using a GPS) and customize/modify the one or more movement characteristics based on the current location of the autonomous vehicle. In some embodiments, instead of being triggered 407 by the change of the status of the traffic light (e.g., the traffic light turns green), the movement predictor 444 may start predicting movement of the one or more other vehicles based on at least one of the current location of the autonomous vehicle, location data, and/or historical data.

In some embodiments, the movement prediction model 470 may be an artificial intelligence model to predict one or more attributes of the one or more other vehicles. The artificial intelligence model may be configured to ingest data from at least one sensor of the autonomous vehicle and predict the attributes of the one or more other vehicles. In an embodiment, the artificial intelligence module is configured to predict a plurality of predetermined attributes of each of the one or more other vehicles relative to the autonomous vehicle. The predetermined attributes may include attributes relating to whether and/or when each of the one or more other vehicles starts moving. In an embodiment, the artificial intelligence model is a predictive machine learning model that may be continuously trained using updated data, e.g., data including at least one of (1) the status/state of the traffic light, (2) vehicle movement history, (3) what the speed limit is, (4) what direction the vehicles are facing, (5) whether there is somebody or something in front of the vehicles or not, (6) whether the vehicles are predicted to make a lane change or turn, or (7) whether the drivers of the vehicles press the brakes or not. In various embodiments, the artificial intelligence model may employ any class of algorithms that are used to understand relative factors contributing to an outcome, estimate unknown outcomes, discover trends, and/or make other estimations based on a data set of factors collected across prior trials. In an embodiment, the artificial intelligence model may refer to methods such as logistic regression, decision trees, neural networks, linear models, and/or Bayesian models.

Figure 5:
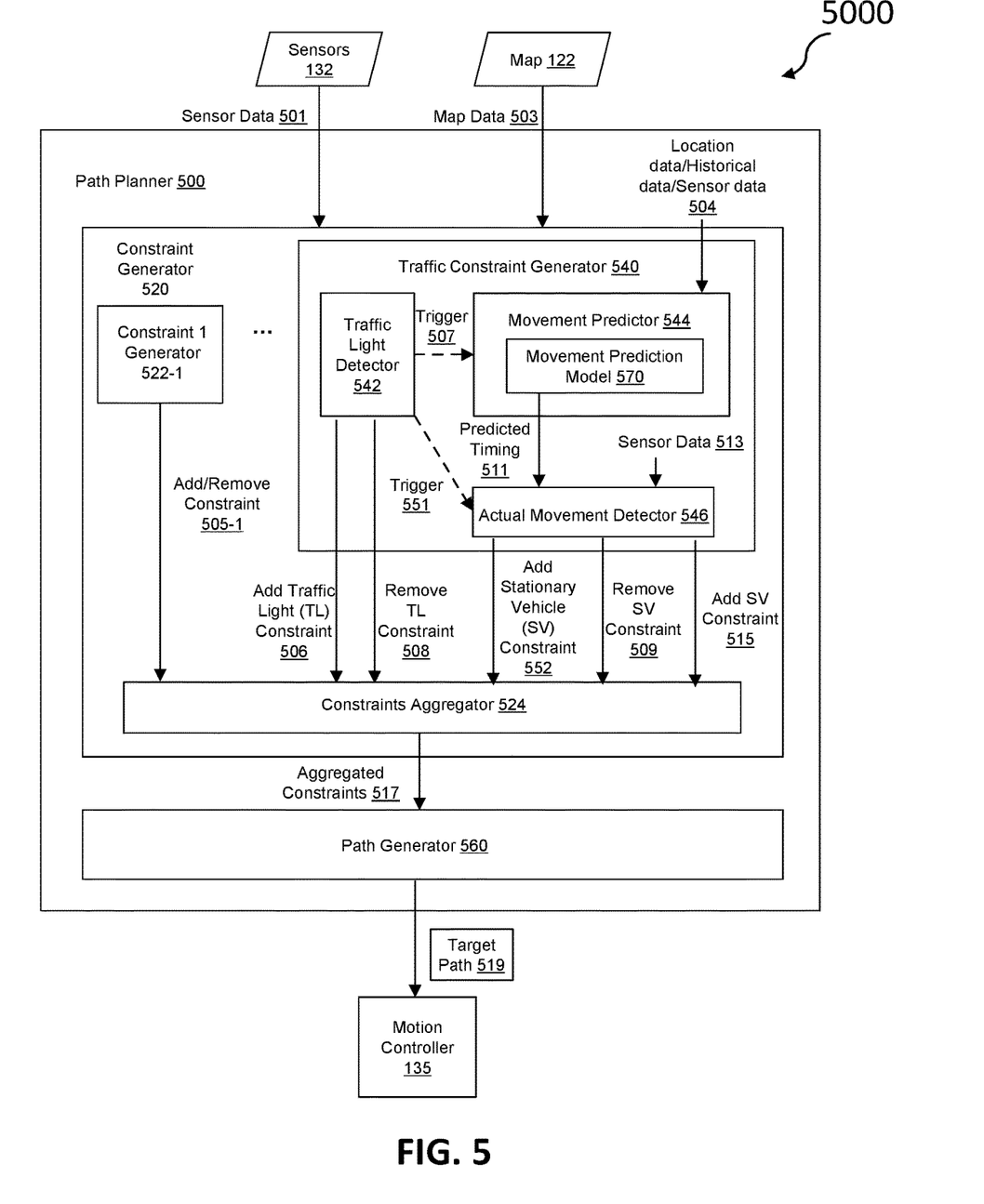
FIG. 5 illustrates a block diagram of generating a path (trajectory) using a prediction-based path generation system, according to an embodiment.

FIG. 5 illustrates a block diagram of generating a path (trajectory) using a prediction-based path generation system 5000, according to an embodiment. The prediction-based path generation system 5000 of an autonomous vehicle (e.g., autonomous vehicle 310) may include one or more sensors 132, map 122 (e.g., HD map), a path planner 500, and/or a motion controller 136. The path planner 500 may include a constraint generator 520 and/or a path generator 560. The constraint generator 520 may generate/consolidate constraints based on sensor data 501 and/or map data 503, and send the constraints (e.g., aggregated constraints 517) to the path generator 560. The constraint generator 520 may include a plurality of specific constraint generators (522-1, 522-2, . . . ) configured to respectively generate a plurality of constraints, and a constraints aggregator 524 configured to aggregate constraints that are generated from the plurality of specific constraint generators. Each specific constraint generator can add or remove (505-1, 505-2, . . . ) a constraint to or from the constraints aggregator 524 so that the constraints aggregator 524 can aggregate the outstanding constraints and output the aggregated constraints 517 to the path generator 560. The path generator 560 may generate, based on the aggregated constraints 517, a target path 519, and send out the target path 519 to the motion controller 136 so that the motion controller 136 can execute the target path/trajectory 519. The plurality of specific constraint generators may include a traffic light generator 540 configured to generate one or more traffic light constraints (e.g., stopping at a red light). In some embodiments, the traffic constraint generator 540 may include a traffic light detector 542 configured to detect/monitor the status/state of a traffic light (e.g., traffic light 350), a movement predictor 544 configured to predict movement of the one or more other vehicles (e.g., first vehicle 320, second vehicle 330), and/or an actual movement detector 546 configured to detect movement of the one or more other vehicles at a predicted time 511. In some embodiments, upon detecting a red light, the traffic light detector 542 may add 506 a traffic light constraint (e.g., stopping at the red light) to the constraints aggregator 524, and upon detecting a green light, the traffic light detector may remove 508 the traffic light constraint from the constraints aggregator 524. In some embodiments, upon detecting a red light, the traffic light detector 546 may trigger 551 the actual movement detector 546 such that the actual movement detector 546 may determine whether there are one or more other vehicles (e.g., first vehicle 320, second vehicle 330). In response to determining that there are one or more other vehicles, the actual movement detector 546 may add a stationary vehicle constraint 552 to the constraints aggregator 524. The movement predictor 544 may be configured to preemptively generate or produce a torque value of the vehicle by predicting movement of one or more other vehicles (e.g., first vehicle 320, second vehicle 330). The path planner 500 (and components thereof) may be a software module, which may be executed by one or more processors.

In response to the traffic light detector 542 detecting that the traffic light turns green, the traffic light detector 542 may trigger 507 the movement predictor 544 to predict movement of the one or more other vehicles (e.g., predicting a movement time of the first vehicle 310 or the second vehicle 320 which is stopped currently). In response to the movement predictor 544 predicting a movement time 511, the movement predictor 544 may remove 509 the stationary vehicle constraint (which has been added by the actual movement detector 546 upon the light turning red) from the constraints aggregator 524. In this manner, the path planner 500 can react to the removal 509 of the stationary vehicle constraint by requesting an execution of the target path 519 (e.g., moving in a way that would violate the current traffic conditions, such as there are one or more stationary vehicles ahead) by knowing that the actual movement of the autonomous vehicle would not violate the future constraints. For example, when the constraints aggregator 524 sends the outstanding constraints (without the stationary vehicle constraint) to the path generator 560, the path generator 560 may cause the motion controller 135 to execute the target path 519 by immediately releasing a clutch (or torque convertor) to engage the clutch with the powertrain. In this manner, the traffic constraint generator 540 can preemptively initiate a drive-off of the autonomous vehicle at a predetermined time (e.g., 1.5 seconds) before the predicted movement time 511 so that the powertrain can be already engaged when the one or more other vehicles are ready to move, thereby removing/reducing the delay for engaging the clutch with the powertrain.

In response to the movement predictor 544 predicting a movement time 511, the movement predictor 544 may send the predicted movement time 511 to the actual movement detector 546 so that the actual movement detector 546 can check/determine, based on the sensor data 513, whether the one or more other vehicles actually move at the predicted movement time 511. In response to determining that the one or more other vehicles do not move at the predicted movement time 511, the actual movement detector 546 may add 515 a stationary vehicle constraint back to the constraints aggregator 524. For example, when the constraints aggregator 524 sends the outstanding constraints 517 (including the stationary vehicle constraint added by the actual movement detector 546) to the path generator 560, the path generator 560 may cause the motion controller 135 (e.g., the transmission control and the brake control of the motion controller 135) to step on the brake by disengaging a clutch (or torque convertor) from the powertrain. In this manner, if the one or more other vehicles in front do not move as predicted, the path generator 560 can cause the powertrain engagement to be aborted by opening the clutch and stepping on the brake.

Referring to FIG. 5, the movement predictor 544 may predict movement of the one or more other vehicles using a movement prediction model 570. The movement prediction model 570 may use an extrapolation of one or more movement characteristics of the one or more other vehicles. The one or more movement characteristics may include at least one of (1) the status/state of the traffic light (e.g., turning green), (2) vehicle movement history, (3) what the speed limit is, (4) what direction the vehicles are facing, (5) whether there is somebody or something in front of the vehicles or not, (6) whether the vehicles are predicted to make a lane change or turn, or (7) whether the drivers of the vehicles press the brakes or not (which can be detected from the brake lights 321, 331). The movement predictor 544 may obtain the one or more movement characteristics from data 504 including at least one of location data (e.g., from the map data), historical data (e.g., historical data associated with the traffic light, or historical data associated with the location) or sensor data. In some embodiments, the movement prediction model 570 may use location data and historical data associated with the traffic light to predict the change of status of the traffic light. The movement predictor 544 may receive the location data and/or historical data from an external server (e.g., external server 111) based on the current location of the autonomous vehicle (e.g., using a GPS) and customize/modify the one or more movement characteristics based on the current location of the autonomous vehicle. In some embodiments, instead of being triggered 507 by the change of the status of the traffic light (e.g., the traffic light turns green), the movement predictor 544 may start predicting movement of the one or more other vehicles based on at least one of the current location of the autonomous vehicle, location data, and/or historical data.

In some embodiments, the movement prediction model 570 may be an artificial intelligence model to predict one or more attributes of the one or more other vehicles. The artificial intelligence model may be configured to ingest data from at least one sensor of the autonomous vehicle and predict the attributes of the one or more other vehicles. In an embodiment, the artificial intelligence module is configured to predict a plurality of predetermined attributes of each of the one or more other vehicles relative to the autonomous vehicle. The predetermined attributes may include attributes relating to whether and/or when each vehicle starts moving. In an embodiment, the artificial intelligence model is a predictive machine learning model that may be continuously trained using updated data, e.g., data including at least one of (1) the status/state of the traffic light, (2) vehicle movement history, (3) what the speed limit is, (4) what direction the vehicles are facing, (5) whether there is somebody or something in front of the vehicles or not, (6) whether the vehicles are predicted to make a lane change or turn, or (7) whether the drivers of the vehicles press the brakes or not. In various embodiments, the artificial intelligence model may employ any class of algorithms that are used to understand relative factors contributing to an outcome, estimate unknown outcomes, discover trends, and/or make other estimations based on a data set of factors collected across prior trials. In an embodiment, the artificial intelligence model may refer to methods such as logistic regression, decision trees, neural networks, linear models, and/or Bayesian models.

Figure 6:
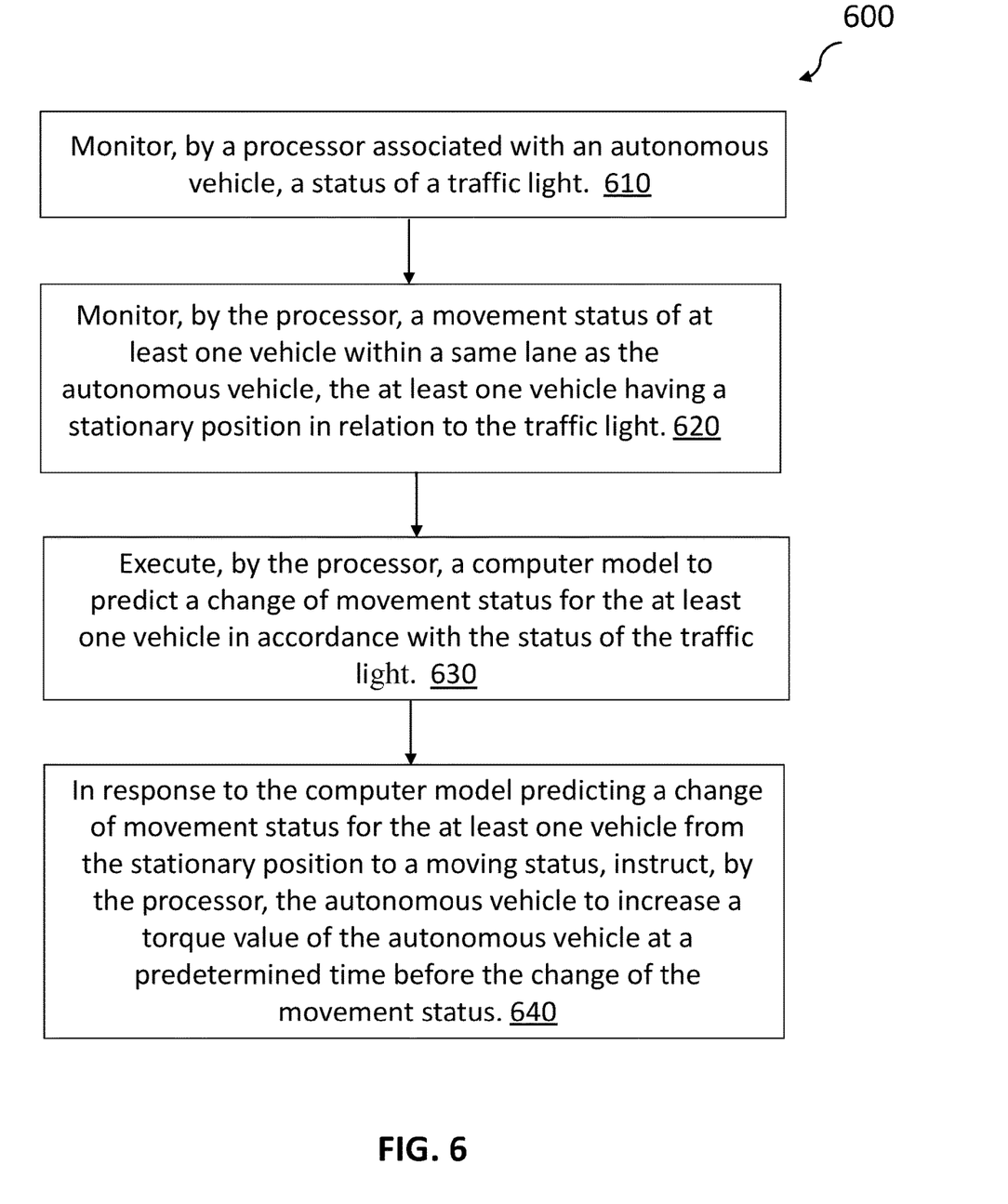
FIG. 6 depicts a flowchart of a method executed in a prediction-based path generation, according to an embodiment.

FIG. 6 depicts a flowchart of a method executed in a prediction-based path generation, according to an embodiment. The method 600 shown in FIG. 4 comprises execution steps 410-440. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously.

FIG. 6 is described as being performed by one or more processors associated with an autonomous vehicle, such as the processor 134 or motion controller 135 as depicted in FIG. 1. However, in some embodiments, one or more of the steps may be performed by a different processor, server, or any other computing feature. For instance, one or more of the steps may be performed via a cloud-based service or another processor in communication with the one or more processors of the autonomous vehicle and/or its autonomy system. Although the steps are shown in FIG. 6 having a particular order, it is intended that the steps may be performed in any order. It is also intended that some of these steps may be optional.

Using the method 600, the processor may control torque of an autonomous vehicle or generate a path/trajectory of the vehicle, based on prediction of movement of one or more other vehicles, for example. Even though aspects of the present disclosure discusses a torque control based on prediction of movement of other vehicles, the method 600 is applicable to a torque control based on prediction of movement of any objects that are able to move.

In an embodiment of the step 610, the processor (e.g., traffic light detector 442, 542) may monitor a status of a traffic light (e.g., traffic light 350).

In an embodiment of the step 620, the processor (e.g., actual movement detector 446, 546) may monitor a movement status of at least one vehicle (e.g., vehicle 320) within a same lane as the autonomous vehicle (e.g., vehicle 310), the at least one vehicle having a stationary position in relation to the traffic light.

In an embodiment of the step 630, the processor (e.g., movement predictor 444, 544) may execute a computer model (e.g., movement prediction model 470, 570) to predict a change of movement status for the at least one vehicle in accordance with the status of the traffic light. For example, the traffic light detector 442 may trigger the movement predictor 444 to perform a movement prediction. In some embodiments, the computer model may be a machine learning model (e.g., logistic regression, decision trees, neural networks, linear models, and/or Bayesian models) trained to predict an estimated time (e.g., predicted time 411, 511) for a status change of the traffic light or the change of movement status. In some embodiments, the computer model uses location data and historical data associated with the traffic light to predict the change of status of the traffic light.

In an embodiment of the step 640, in response to the computer model predicting a change of movement status for the at least one vehicle from the stationary position to a moving status, the processor (e.g., actual movement detector 446) may instruct the autonomous vehicle to increase a torque value of the autonomous vehicle (e.g., request 409 for releasing the clutch) at a predetermined time (e.g., 1.5 seconds) before the change of the movement status (e.g., before the predicted time 411). In some embodiments, the instructing the autonomous vehicle to increase the torque value corresponds to instructing the autonomous vehicle to release a clutch of the autonomous vehicle. The predetermined time may correspond to a time to release the clutch of the autonomous vehicle (e.g., 1.5 seconds).

In some embodiments, the processor may instruct the autonomous vehicle to activate a powertrain engagement mechanism (e.g., gearbox or gear engagement system). The predetermined time may correspond to a time to activate the powertrain engagement of the autonomous vehicle (e.g., 1.5 seconds).

In some embodiments, monitoring the movement status of the at least one vehicle (e.g., vehicle 320, 330) corresponds to monitoring a brake light (e.g., 321, 331) associated with the at least one vehicle. In some embodiments, the processor (e.g., actual movement detector 446) may determine whether the movement status for the at least one vehicle changes from the stationary position to the moving status at a time of the predicted change of movement status (e.g., predicted time 411). In response to determining that the movement status for the at least one vehicle does not change from the stationary position to the moving status at the time of the predicted change of movement status, the processor may instruct the autonomous vehicle to stop increasing the torque value of the autonomous vehicle (e.g., request 415 for pressing the clutch).

In some embodiments, the processor (e.g., path planner 500, constraint generator 520) may control the autonomous vehicle to satisfy one or more constraints relating to movement of the autonomous vehicle, including a traffic light constraint (e.g., constraint of stopping at a traffic light). In response to the computer model (e.g., movement prediction model 570) predicting the change of movement status for the at least one vehicle from the stationary position to the moving status, the processor (e.g., movement predictor 544) may determine whether the predicted change of movement status satisfies the traffic light constraint. In response to determining that the predicted change of movement status satisfies the traffic light constraint (e.g., determining that the predicted movement at the predicted movement time 511 does not violate the traffic light constraint), the processor (e.g., movement predictor 544) may remove 509 the traffic light constraint from the one or more constraints (e.g., constraints in the constraints aggregator 524).

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed:

1. A system for reducing autonomous vehicle delay, the system comprising:
   a sensor configured to detect a movement status of at least one vehicle; and
   a computing device comprising a processor and a non-transitory computer readable storage in communication with the sensor, the processor configured to:
   receive, from the sensor, sensor data representing the movement status of the at least one vehicle;
   execute an artificial intelligence module to process the sensor data to predict a change of movement status for the at least one vehicle based on the movement status of the at least one vehicle; and
   initiate an autonomous vehicle movement corresponding to the change of movement status for the at least one vehicle.

2. The system of claim 1, wherein the sensor is further configured to detect a status of a traffic light, and wherein the processor is further configured to receive sensor data representing the status of the traffic light.

3. The system of claim 1, wherein the processor is further configured to process location data and historical data to predict the change of movement status.

4. The system of claim 1, wherein the autonomous vehicle movement is engaging a powertrain of the autonomous vehicle.

5. The system of claim 1, wherein the artificial intelligence module comprises at least one of: a logistic regression, a decision tree, a neural network, a linear model, or a Bayesian model.

6. The system of claim 5, wherein the artificial intelligence module is trained on a data set of factors collected across a plurality of prior trials.

7. The system of claim 6, wherein the data set from the plurality of prior trials comprises at least one of: a status of a traffic light, a vehicle movement history, a speed limit, a direction of the at least one vehicle, objects in front of the at least one vehicle, a predicted lane change or turn for the at least one vehicle, or a braking status of the at least one vehicle.

8. An autonomous vehicle comprising:
   a powertrain comprising a transmission and a brake;
   a sensor disposed on the autonomous vehicle configured to detect a movement status of at least one vehicle; and
   a computing device comprising a processor and a non-transitory computer readable storage in communication with the sensor, the processor configured to:
   receive, from the sensor, sensor data representing the movement status of the at least one vehicle;
   execute an artificial intelligence module to predict a change of the movement status for the at least one vehicle based on the sensor data; and
   engage the transmission of the powertrain and disengage the brake of the powertrain to initiate an autonomous vehicle movement corresponding to the change of movement status for the at least one vehicle.

9. The autonomous vehicle of claim 8, wherein the sensor is further configured to detect a status of a traffic light, and wherein the processor is further configured to receive sensor data representing the status of the traffic light.

10. The autonomous vehicle of claim 8, wherein the processor is further configured to process location data and historical data to predict the change of movement status.

11. The autonomous vehicle of claim 8, wherein the artificial intelligence module comprises at least one of: a logistic regression, a decision tree, a neural network, a linear model, or a Bayesian model.

12. The autonomous vehicle of claim 8, wherein the artificial intelligence module is trained on a data set of factors collected across a plurality of prior trials.

13. The autonomous vehicle of claim 12, wherein the processor is further configured to detect a change in brake lights of the at least one vehicle from the sensor data to detect the change in movement status of the at least one vehicle.

14. The autonomous vehicle of claim 8, further comprising increasing a torque value at a predetermined time before the initiation of the movement of the autonomous vehicle.

15. A computer-implemented method for reducing autonomous vehicle delay, the method comprising:
   receiving, from a sensor, sensor data representing a status of at least one vehicle;
   executing an artificial intelligence module to predict a change of movement status for the at least one vehicle based on the sensor data; and
   initiating an autonomous vehicle movement corresponding to the change of movement status for the at least one vehicle.

16. The method of claim 15, further comprising receiving sensor data representing a status of a traffic light and processing the sensor data to predict the change of movement status for the at least one vehicle.

17. The method of claim 15, further comprising processing location data and historical data to predict the change of movement status.

18. The method of claim 15, wherein the initiated movement is engaging a powertrain of the autonomous vehicle.

19. The method of claim 15, wherein the artificial intelligence module comprises at least one of: a logistic regression, a decision tree, a neural network, a linear model, or a Bayesian model.

20. The method of claim 19, wherein the artificial intelligence module is configured to predict a plurality of predetermined attributes of the at least one vehicle relative to the autonomous vehicle.

\* \* \* \* \*